United States Patent [19]
Frohn et al.

[11] Patent Number: 5,099,117
[45] Date of Patent: Mar. 24, 1992

[54] SCANNING TUNNEL MICROSCOPE CAPABLE OF DETECTING ELECTRONS EMANATING FROM A SPECIMEN

[75] Inventors: Josef Frohn, Herzogenrath; Harald Ibach, Aachen-Verlautenheide, both of Fed. Rep. of Germany

[73] Assignee: Forschungszentrum Juelich GmbH, Juelich, Fed. Rep. of Germany

[21] Appl. No.: 533,406

[22] Filed: Jun. 5, 1990

[30] Foreign Application Priority Data

Jun. 5, 1989 [DE] Fed. Rep. of Germany ....... 3918249

[51] Int. Cl.⁵ ...................... H01J 37/252; H01J 41/48
[52] U.S. Cl. ................................. 250/306; 250/305; 250/310
[58] Field of Search ................. 250/306, 307, 305, 310

[56] References Cited

U.S. PATENT DOCUMENTS 3,631,238 12/1971 MacDonald ......................... 250/307
4,698,502 10/1987 Bednorz et al. ..................... 250/306

OTHER PUBLICATIONS

"Auger Electron Energy Analyzer Using a Cylindrical Mirror with Ring-to-Axis Focusing", T. V. Krachino et al, 2348 Soviet Physics Technical Physics 28 (1983), Oct., No. 10.
"Scanning Tunneling Microscope Combined with a Scanning Electron Microscope", Ch. Gerber et al, 8127 Review of Instruments 57 (1986), Feb., No. 2.

*Primary Examiner*—Jack I. Berman
*Attorney, Agent, or Firm*—Foley & Lardner

[57] ABSTRACT

A scanning tunnel microscope having an emission tip, specimen holder and xyz movement mechanism as well as devices for applying a voltage between the emission tip and the specimen and for detecting the electrons emanating from the specimen can be used for verifying secondary electrons generated in the same surface region and/or an energy analysis of electrons emitted by the emission tip and scattered by the surface if a cylindrical mirror analyzer with assigned detector is arranged coaxially to the emission tip. With relatively high applied voltages, a cylindrically symmetrical correction electrode between the emission tip and the cylindrical mirror, arranged coaxially to the emission tip, is expedient, with which electrode the imaging properties of the analyzer open toward the specimen are made to approximate those of a conventional cylindrical mirror. A masking device allows a solid angle-oriented detection of scattered and secondary electrons. The outer cylinder of the cylindrical mirror may, at least in part, be made transmissive to photons, which are verified by a detector arranged on the outside. A channel multiplier plate with a fluorescent screen, provided opposite the emissions tip, allows detection of structural and/or emission properties of the emission tip by field ion microscopy or field electron microscopy.

11 Claims, 3 Drawing Sheets

SCANNING TUNNEL MICROSCOPE CAPABLE OF DETECTING ELECTRONS EMANATING FROM A SPECIMEN

BACKGROUND OF THE INVENTION

The invention relates to a scanning tunnelling microscope having an emission tip, a specimen holder for receiving specimens arranged a short distance from the tip, a scanning movement mechanism for xyz movement between the specimen and the tip as well as having devices for applying a voltage between the emission tip and the specimen and for detecting electrons emanating from the specimen.

DISCUSSION OF THE RELATED ART

When imaging a surface with a standard tunnel microscope, a very fine tip (the tunnel tip) is brought in a known way in front of the specimen under investigation to a distance of less than one nanometer (G. Binnig et al, Phys. Rev. Lett. 49 (1982) page 59). By applying a voltage between the specimen and the tunnel tip, a tunnel current flows. A suitable servo mechanism keeps this current constant while the tunnel tip scans the specimen. Since the tunnel current depends sensitively on the distance of the tunnel tip from the surface, the servo signal provides an image of the structure with atomic resolution.

Many variations of tunnel microscopes have become known, (for example, P. K. Hansma et al, J. Appl. Phys. 61 (1987) 81, or Y. Kuk et al, Rev. Sci Instr. 60 (1989) 165). The interpretation of tunnel-microscopic images is often made more difficult by the fact that it has not as yet been possible to obtain sufficient spectroscopic information of the surface in the same surface region and with comparable resolution. A certain form of spectroscopy, which can be employed (particularly in the case of semiconductors) permits measurement of the conductance of the tunnel gap between the specimen and the tunnel tip as a function of the applied voltage. However, this tunnel spectroscopy is limited in its possible applications since the voltage between the tunnel tip and the specimen can only be chosen to be very small, because if voltages are too great the tunnel currents become too great and the specimen and/or the tip are destroyed.

In principle it is possible to have the tip at a relatively great distance from the surface and, as a result, to reduce the tunnel current and increase correspondingly the voltage which can be applied. If, however, the distance is increased to a range which is greater than approximately one nanometer, the tunnel process only takes place directly in front of the emission tip itself. The released electrons are then accelerated onto the specimen. If the voltage between the emission tip and the specimen is high enough, secondary electrons are released by the specimen. The process just described is usually referred to as field emission. The transition from tunnel operation to field emission operation was first described by R. Young et al (Phys. Rev. Lett. 27 (1971) 922 and Rev. Sci. Instr. 43 (1972) 999), as was a microscope which, depending on the distance between the tip and the specimen, operates either as a field emission tip microscope or as a tunnel microscope.

Field emission tips are known as cathodes for electron beam generation in beam generation systems, like those employed for example in electron microscopes (see in this respect Ludwig Reimer, "Scanning Electron Microscopy", Springer, 1985). The necessary beam generation and guidance systems are very complex and of great volume. So far it has not been technically possible to direct a beam generated in this way reproducibly onto a surface region, which was previously investigated, or simultaneously or subsequently investigated by tunnel microscope.

SUMMARY OF THE INVENTION

The object of the invention is thus an apparatus, which on one hand performs tunnel microscopy with atomic resolution and on the other hand verifies the generation of secondary electrons in this same surface region and is capable of performing an energy analysis of the secondary electrons and/or an energy analysis of electrons emitted by the emission tip and scattered by the surface, while simultaneously retaining the highest possible resolution.

This object is achieved according to the present invention with a scanning tunnel microscope which comprises a cylindrical mirror analyzer, arranged coaxially to an emission tip, with an assigned detector for detecting secondary electrons emanating from the specimen and/or electrons elastically or inelastically scattered by the specimen upon subjecting the specimen to an electron beam of appropriate energy emitted by the emission tip, while changing the distance and/or the voltage between the emission tip and the specimen.

Hence, a novel instrument is proposed which consists of a combination of a scanning tunnel microscope with an integrated scanning secondary electron microscope, a scanning electron energy loss microscope and a scanning electron diffraction microscope.

In all of the applications described, microscopic imaging by the scanning principle requires a device for moving the emission tip over the specimen surface, as well as a device for setting the distance between specimen and emission tip. This can be carried out particularly advantageously by use of piezoelectric actuators as are described in German patent specification 3,610,540. For a coarse setting of the distance of the emission tip from the surface, the specimen may be fixed in a ring which has three inclined planes arranged radially around the emission tip. In interaction with the micromanipulator described in the German patent application P 38 22 504.2-15, this ring allows a coarse setting of the distance.

Appropriate masking means may also be used to provide for a solid angle-dependent detection of the scattered and/or secondary electrons.

The generation of a suitable beam for exciting secondary electrons or for scattering electrons at surfaces expediently takes place in the present embodiment in the manner proposed by Young et al, by maintaining the tunnel tip in front of the specimen a distance greater than one nanometer, and using the same movement devices for the emission tip and/or the specimen as are used in tunnel microscopy. The distance of the emission tip from the specimen depends on the desired kinetic energy with which the electrons hit the specimen and the desired or allowable current with which the specimen is to be subjected.

Of particular importance in relation to the layout according to the invention is the quality of the emission tip which preferably is heated in situ to evaporate impurities, sharpened by sputtering (gas bombardment), further purified and which optionally may be improved relative to quality by field evaporation. These operations may be carried out repeatedly.

Indirect heating is especially convenient for the etched tip preferably mounted exchangable on a piezoelectric actuator, for example by means of a spiral-wound filament that may be removed from its operational position, such as indicated in FIG. 3. The tip is at a high positive potential relative to the heated filament and the filament is charged for a short period of time with a heating current of for example 1-2 Ampere. The electrons released by thermal emission by the filament impact with the corresponding energy the tip which is heated to high temperatures.

The sputtering treatment is carried out by the short time introduction of a gas (for example Ne or Ar) with the tip charged negatively relative to ground.

Field evaporation may be carried out by means of the devices for field ion or field electron microscopy indicated farther below.

The lateral resolution which ca be achieved according to the present invention depends on the lateral extent of the beam generated by the emission tip and is basically a linear function of the distance of the emission tip from the surface. Special tip preparations also allow a more directed emission of electrons by the tunnel tip, so that in favorable cases the lateral extent of the beam hitting the specimen may be less than 1/10 of the distance of the tip from the surface.

A process for this has been specified, for example, by H. W. Fink in the IBM Journal of Research and Development, Volume 30, page 460 (1986). An unavoidable disadvantage of the method of generating a fine-focused beam described there, is the strong electric field between the specimen and the emission tip. Such a strong field at the specimen contrasts the conditions in a conventional scanning electron microscope, scanning Auger spectrometer or energy loss microscope. For a conventional scanning electron microscope it is possible, for example, to divert the generated secondary electrons by a low electric field and provide detection, as described inter alia in the monograph by Reimer (see above). In the arrangement according to the present invention of beam generation in a tunnel microscope, all of the generated secondary electrons and/or the scattered electrons (to a particular extent those with low kinetic energy) are deflected by the field between the specimen and the emission tip and even fed back to the specimen.

According to the present invention, on the other hand, even in the presence of a strong field between the emission tip and the specimen, secondary electrons, released from the specimen and/or electrons emitted by the emission tip and elastically or inelastically scattered at the specimen can be effectively analyzed and verified with respect to their energy.

This is possible because the specimen and emission tip are now made into an integral part of the electron energy analyzer and detector. Owing to the axial symmetry provided by the specimen and the emission tip (the axis of symmetry being in the direction of a normal to the specimen surface), the energy analysis is advantageously carried out by an electron energy selector which has the same symmetry and is known as a cylindrical mirror. Such an analyzer is known per se from the monograph by S. Ertl and J. Kuppers "Low Energy Electrons and Surface Chemistry", Verlag Chemie, 1985, (see for instance page 22). According to that reference, a cylindrical mirror consists of two concentric metallic cylinders, between which a voltage is applied. In this arrangement, an inner cylinder has suitably chosen openings, which are shielded by meshes. With a suitable voltage difference between the inner cylinder and an outer cylinder, electrons which emanate from a point on the cylinder axis are focused again on a point on the cylinder axis. The solid angle detected in imaging is in this case 360° in the azimuthal direction, and between 10° and 20° in the radial direction, depending on the desired energy resolution.

European Patent Specification 0,189,498 discloses a special type of secondary electron microscope, namely an Auger electron microscope, which uses a field emission tip. However, this device detects only a small part of the solid angle, resulting in a corresponding disadvantage of detecting secondary electrons. Although the specific difficulty arising due to the strong electric field between the emission tip and the specimen, and the disturbing influence of the field on the paths of the secondary electrons are mentioned in the European patent specification, no way of solving the problem is indicated. The field problem is all the more serious if the kinetic energy of the electrons emitted or backscattered by the specimen is low in comparison with the difference in potential energy between the emission tip and the specimen.

In order for a conventional cylindrical mirror, as outlined above, to function, an electron-optically satisfactory termination of the fringing field at both ends of the cylindrical tubes as well required, neither condition is met by the inventive arrangement. In particular according to the present invention, a correction electrode is provided, which is arranged with cylindrical symmetry about the emission tip. Electron-optical calculations show that, with a suitable shaping of the correction electrode (for example in a conical design, as shown) and with a suitable potential at the correction electrode, it is possible, in spite of the strong electric field between the emission tip and the specimen, to influence secondary electrons released at the specimen or electrons scattered from the specimen in such a way that the modified cylindrical mirror analyzer is comparable in its imaging properties to a conventional cylindrical mirror. Furthermore, the correction electrode allows an equipotential area of the specimen to be used for the termination of the cylindrical mirror, since the resultant change in the fringing field in the cylindrical mirror can likewise be compensated by the correction electrode. The voltage to be applied to the correction electrode in this case depends on the voltage between the emission tip and the specimen on the one hand, and the chosen transmission energy for the cylindrical mirror on the other hand. It is of course also influenced by the shape of the correction electrode. The lower the kinetic energy of the electrons (coming from the specimen) to be detected in relation to the energy of the primary electron beam, the higher the voltage to be applied to the correction electrode. This correction electrode is important in particular at relatively high applied voltages.

According to the invention, the specimen may be subjected to high currents even at low voltages between the specimen and the tunnel tip. Furthermore, as an energy analyzer with its downstream electron detector, the cylindrical mirror also allows energy analysis of the electrons emitted by the tunnel tip and inelastically or elastically scattered from the specimen. As a result, the specimen can also be examined microscopically using characteristic energy losses or elastic electron scattering to produce the image contrast. The imaging by a scanning microscope of surfaces using elastic electrons is also known as scanning LEED and has been described, for example, by Kirschner et al in "Scanning Electron Microscopy" (1988) II, page 331. It is known that this technique can be used to image states of surface order. Characteristic energy losses from electrons are produced on the other hand by excitations of surface vibrations or by electronic losses (see in this respect H. Ibach, D. L. Mills, "Electron Energy Loss Spectroscopy and Surface Vibrations", Academic Press 1982). The apparatus described therefore also allows the microscopic imaging of surfaces based on the local distribution of certain vibrational and/or electronic excitations. Owing to the low voltage necessary in this case between the specimen and the emission tip of 1-10 V, a small distance of the tip from the specimen may also be chosen (for example 1-10 nm). The specimen is then irradiated with electrons only in a small region, with the advantage of resolutions of microscopy as described above. Particularly high energy resolution is achieved in this application if the emission tip is cooled, preferably with liquid nitrogen or liquid helium.

The cylindrical mirror analyzer with the correction electrode, used according to the invention, also allows the imaging of secondary electrons of low kinetic energy even when the kinetic energy of the exciting electrons is high. Since the reference point of the kinetic energy of the secondary electrons is the local potential of the specimen, the microscope specified here can also be used for imaging a potential contrast. Such a potential contrast occurs for example due to a locally differing work function for electrons in the case of inhomogeneous specimens or semiconductor devices which are supplied with electric voltages. The already mentioned monograph by Reimer describes this imaging process from page 265.

Use of the tunnel current and use of electrons scattered or emitted by the specimen for generating the microscopic image contrast are described above. However, it is readily possible to extend the apparatus described to the extent that photons emitted by the specimen, due to electron collision, are also used for image contrast. Depending on whether the emitted photons occur as the end product of a de-energizing cascade in the specimen or in a direct conversion process of the kinetic energy of the electrons into photon energy occurring on the specimen, one speaks of cathodoluminescence or an inverse photo effect, respectively. To verify the existence of the photons, the outer cylinder of the cylindrical mirror analyzer is designed as a partially translucent mesh or else as a conductive, transparent layer (for example an $SnO_2$ layer) on a transparent tube. After the substantially unhindered passage of the photons through the outer cylinder, the photons can be verified by a conventional semiconductor photon detector, expediently disposed in an annular manner around the cylinder.

These and other objects and advantages of the invention will become apparent from the following detailed description and the drawings.

DETAILED DESCRIPTION OF THE PREFERRED EMBODIMENT

Figure 1:
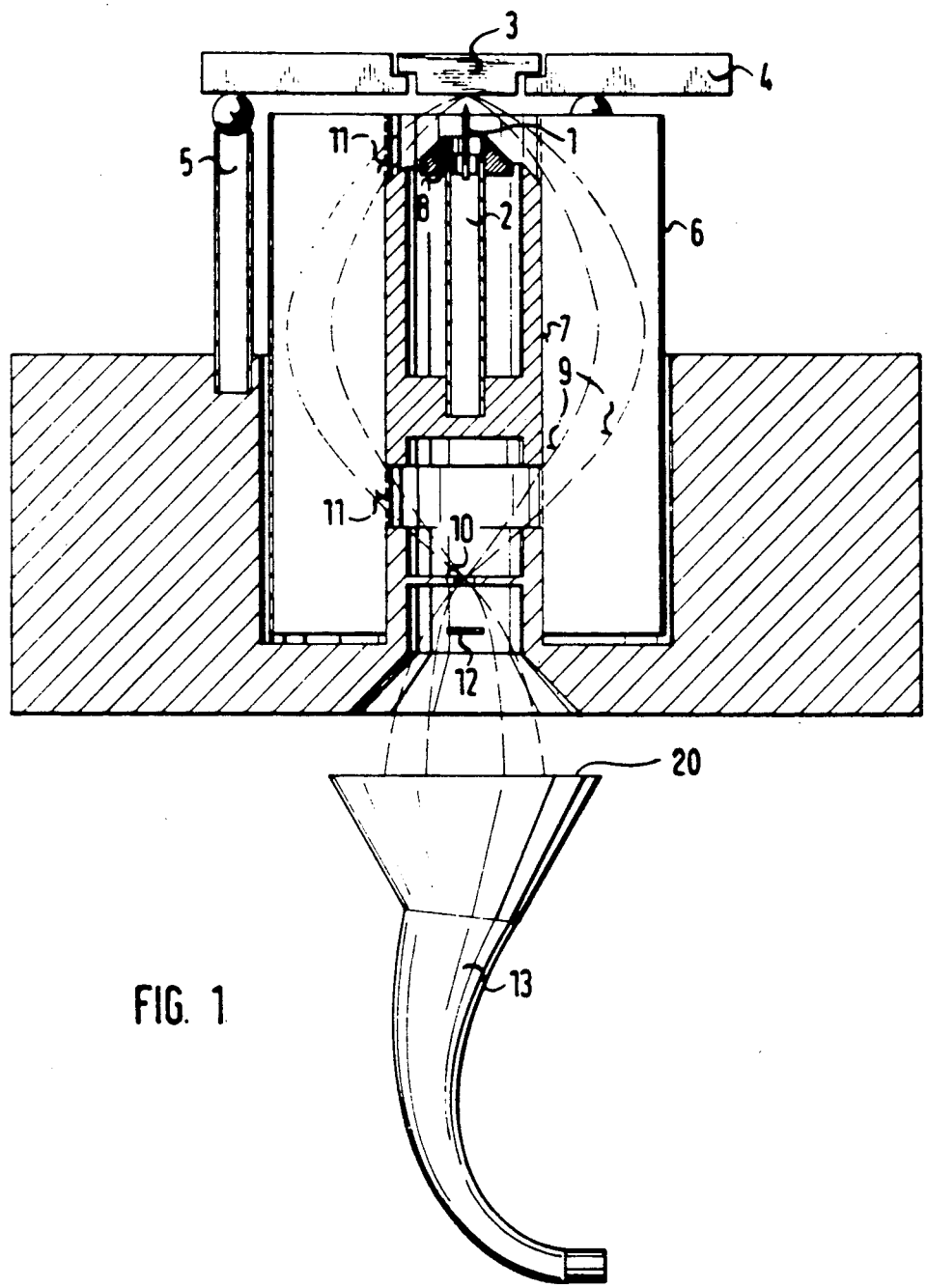
FIG. 1 diagrammatically shows the basic structure of an apparatus according to the invention.

FIG. 1 shows an emission tip 1 fixed on a piezoelectric actuator 2, which allows the setting of the distance between the emission tip 1 and a specimen 3 by applying a voltage to the piezoelectric actuator 2. The emission tip 1 may, for example, consist of a tungsten monocrystal with (111) orientation. In the present embodiment, the specimen 3 rests in a specimen carrier 4, which in turn rests on a micromanipulator, comprising three piezoelectric actuators 5 (only one shown) arranged at an angle of 120° concentrically around the emission tip 1. In correspondence with German patent specification 3,610,540, the piezoelectric actuators 5 allow movement of the specimen 3 in all three spacial directions.

The cylindrical mirror analyzer used for energy analysis of the electrons scattered from the specimen 3 or emitted by the specimen 3 comprises an outer cylinder 6, an inner cylinder 7, and a correction electrode 8. The electrons approximately follow the paths 9 drawn in dot-dashed lines in FIG. 1 provided the voltage between the inner cylinder 6 and the outer cylinder 7 and the voltage at the correction electrode 8 is suitably chosen.

An energy analysis of the electrons is obtained in a standard manner in that electrons of different kinetic energy follow different paths, which do not lead through an exit diaphragm 10. As in conventional cylindrical mirrors, the inner cylinder 7 is in part made from a metallic mesh or grid 11, in order to allow the electrons to pass. It has proved advantageous to focus the electrons, once they have passed through the exit diaphragm 10, on an inlet of an electron detector 13 by a further electrode 12, subjected to a suitably chosen voltage. By combining the grid 11 or the receiving area of the detector 13 with a corresponding masking, element 20 an angle-dependent detection of the scattered and secondary electrons is possible.

Figure 2A:
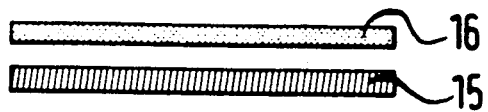
FIG. 2 diagrammatically shows parts of apparatus with modifications for photon detection and for observing the emission tip itself.
Figure 2B:
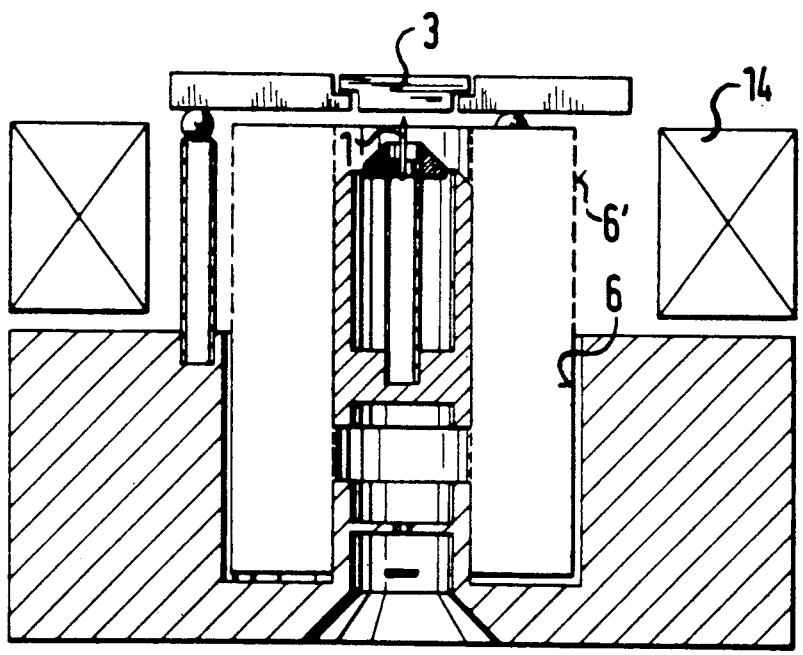
Figure 3:
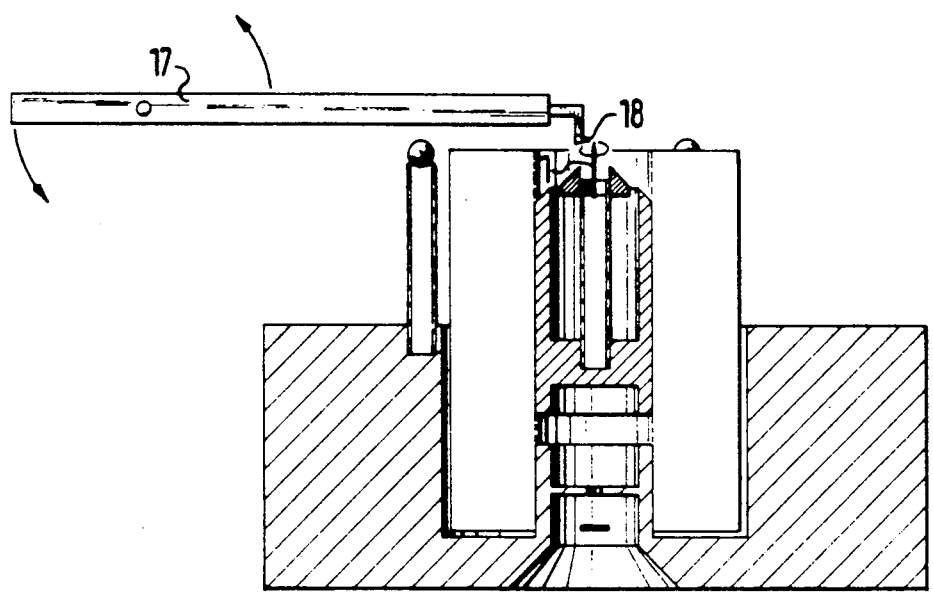
FIG. 3 diagrammatically shows an arrangement for indirectly heating the emission tip.

In the case of the embodiment sketched in FIG. 2, a photon detector 14 is provided. In this case, the outer cylinder 6 comprises a metallic mesh 6', so that a substantially unhindered passage of photons, generated by subjecting the specimen 3 to current from the emission tip 1, is possible. FIG. 2 shows, furthermore, an additional channel multiplier plate 15 with a mesh and fluorescent screen 16 shown at the top of FIG. 2. After removal of the specimen 3 by a manipulator, the channel multiplier plate 15 with mesh and fluorescent screen 16 allows field electron microscopic or field ion microscopic imaging of the tip in a standard manner, as described for example in D. P. Woodruff and T. A. Delchew "Modern Techniques of Surface Science", Cambridge University Press, 1986. As a result, a check on the state of the emission tip 1 is possible, as is a controlled shaping in atomic dimensions by field vaporization and/or ion bombardment, according to work by H. W. Fink in the IBM Journal of Research and Development, Volume 30, (1986).

What is claimed is:

1. A scanning tunnel microscope simultaneously capable of tunnel microscopy and/or detecting secondary electrons emanating from a specimen and/or detecting scattered electrons scattered by said specimen comprising:

a specimen holder means for holding said specimen;

a tunnel and emission tip in front of said specimen for tunnelling and for emitting electrons towards said specimen;

means for xyz-movement of said tip in relation to said specimen;

means for applying varying potential to said tip against said specimen for tunnelling and for emission of electrons towards said specimen, said electrons inducing secondary electrons or being scattered by said specimen resulting in secondary or scattered electrons;

cylindrical mirror analyzer means, arranged coaxially to said tunnel and emission tip, for energy dispersive focusing said scattered electrons and said secondary electrons; and detector means for detecting said electrons passing said analyzer.

2. A microscope as claimed in claim 1, wherein the axis of said cylindrical mirror means is parallel to a normal of the specimen.

3. A microscope as claimed in claim 1, further comprising a cylindrically symmetrical correction electrode arranged between said emission tip and said cylindrical mirror means, said electrode being arranged coaxially to said emission tip and having a freely selectable potential.

4. A microscope as claimed in claim 1, further comprising three piezoelectric actuator means for moving said specimen in three dimensions by applying suitable voltages to said three piezoelectric actuators means.

5. A microscope as claimed in claim 1, further comprising a second piezoelectric actuator means for moving said emission tip along said normal to said specimen.

6. A microscope as claimed in claim 1, further comprising means for heating said emission tip.

7. A microscope as claimed in claim 1, further comprising means for cooling said emission tip.

8. A microscope as claimed in claim 1, wherein at least a portion of said outer cylinder is comprised of a conductive, translucent material and wherein a photon detector is arranged outside said outer cylinder.

9. A microscope as claimed in claim 7, further comprising masking means, for detecting a solid angle of said scattered electrons and/or said secondary electrons.

10. A microscope as claimed in claim 7, further comprising means for detecting and/or affecting structure and/or emission properties of said emission tip by field ion microscopy or field electron microscopy.

11. A microscope as claimed in claim 1, wherein at least a portion of said outer cylinder is comprised of a metallic mesh and wherein a photon detector is arranged outside of said outer cylinder.

* * * * *